(12) United States Patent
Bistuer et al.

(10) Patent No.: US 9,868,544 B2
(45) Date of Patent: Jan. 16, 2018

(54) ROTORCRAFT HAVING FUEL TANKS MOUNTED IN SUSPENSION UNDER A LOAD-BEARING MIDDLE FLOOR OF THE FUSELAGE OF THE ROTORCRAFT

(71) Applicant: AIRBUS HELICOPTERS, Marignane (FR)

(72) Inventors: Olivier Bistuer, La Fare les Oliviers (FR); Stephane Mougin, Rousset (FR); Sebastien Klos, Vitrolles (FR)

(73) Assignee: AIRBUS HELICOPTERS, Marignane (FR)

( * ) Notice: Subject to any disclaimer, the term of this patent is extended or adjusted under 35 U.S.C. 154(b) by 322 days.

(21) Appl. No.: 14/528,300

(22) Filed: Oct. 30, 2014

(65) Prior Publication Data
US 2015/0122939 A1     May 7, 2015

(30) Foreign Application Priority Data
Nov. 5, 2013 (FR) ...................... 13 02559

(51) Int. Cl.
*B64D 37/04* (2006.01)
*B64C 1/06* (2006.01)
(Continued)

(52) U.S. Cl.
CPC ............. *B64D 37/04* (2013.01); *B64C 1/061* (2013.01); *B64C 1/18* (2013.01); *B64C 27/04* (2013.01); *Y02T 50/44* (2013.01)

(58) Field of Classification Search
CPC .......... B64C 1/061; B64C 1/18; B64C 27/04; Y02T 50/44; B64D 37/04
See application file for complete search history.

(56) References Cited

U.S. PATENT DOCUMENTS

| 2,657,884 A | * | 11/1953 | Merrill | ................... B64D 37/06 244/135 B |
| 2,831,490 A | * | 4/1958 | Simcock | ................ B64D 37/22 137/38 |

(Continued)

FOREIGN PATENT DOCUMENTS

| EP | 2567896 | 3/2013 |
| FR | 2756255 | 5/1998 |

(Continued)

OTHER PUBLICATIONS

"Airbus Helicopters Ground Rescue Booklet".*
French Search Report for FR 1302559, Completed by the French Patent Office dated Jul. 4, 2014, 6 Pages.

*Primary Examiner* — Assres H Woldemaryam
(74) *Attorney, Agent, or Firm* — Brooks Kushman P.C.

(57) ABSTRACT

A rotorcraft (1) having a feed unit for feeding fuel to a power plant (13) of the rotorcraft (1). A middle floor (12b) is securely engaged with at least two frames (9a, 9b) of the fuselage, and being load-bearing relative to general forces supported by the fuselage. A bottom compartment (7) of the rotorcraft (1) does not have the load-bearing covering (8) of the fuselage, the bottom face of the fuselage being open to the outside providing the bottom compartment (7) with a bottom (17) open to the outside of the rotorcraft. The bottom face of the middle floor (12b) forms an anchor member for suspending at least one fuel tank (25, 26) that is accessible from outside the fuselage via said open bottom (17).

20 Claims, 2 Drawing Sheets

(51) Int. Cl.
*B64C 1/18* (2006.01)
*B64C 27/04* (2006.01)

(56) References Cited

U.S. PATENT DOCUMENTS

| | | | | |
|---|---|---|---|---|
| 3,158,193 A * | 11/1964 | Anderson | ............... | B63B 1/04 |
| | | | | 137/113 |
| 3,383,078 A * | 5/1968 | Shohet | ............... | B64D 37/04 |
| | | | | 244/135 R |
| 3,966,147 A * | 6/1976 | Wittko | ............... | B64D 37/04 |
| | | | | 220/905 |
| 4,306,693 A * | 12/1981 | Cooper | ............... | B64D 37/12 |
| | | | | 137/572 |
| 4,784,354 A * | 11/1988 | Tavano | ............... | B64D 37/06 |
| | | | | 244/135 B |
| 4,860,972 A * | 8/1989 | Lannerd | ............... | B64D 37/04 |
| | | | | 244/135 R |
| 5,016,670 A * | 5/1991 | Sasaki | ............... | B60K 15/077 |
| | | | | 123/514 |
| 5,371,935 A * | 12/1994 | Furs | ............... | B64D 37/02 |
| | | | | 29/402.03 |
| 5,377,934 A * | 1/1995 | Hill | ............... | B64C 27/04 |
| | | | | 244/117 R |
| 5,451,015 A | 9/1995 | Cronkhite et al. | | |
| 5,562,264 A * | 10/1996 | Bietenhader | ............... | B64C 1/00 |
| | | | | 244/117 R |
| 6,123,495 A * | 9/2000 | Callahan | ............... | B64F 5/0036 |
| | | | | 254/323 |
| 6,149,102 A * | 11/2000 | Marasco | ............... | B64D 37/02 |
| | | | | 244/135 B |
| 7,051,979 B2 * | 5/2006 | Howe | ............... | B64D 37/04 |
| | | | | 244/135 R |
| 7,357,149 B2 * | 4/2008 | Howe | ............... | B64D 37/04 |
| | | | | 137/266 |
| 8,132,758 B2 * | 3/2012 | Army | ............... | B64C 7/00 |
| | | | | 244/118.1 |
| 8,403,261 B2 | 3/2013 | Delahaye et al. | | |
| 8,668,167 B2 * | 3/2014 | Mark | ............... | B64D 1/16 |
| | | | | 244/135 A |
| 8,709,584 B2 * | 4/2014 | Carstensen | ............... | B64D 9/003 |
| | | | | 244/133 |
| 8,905,351 B2 * | 12/2014 | Buscher | ............... | B64C 39/024 |
| | | | | 244/118.1 |
| 2001/0010345 A1 * | 8/2001 | Clifford | ............... | B64C 1/062 |
| | | | | 244/119 |
| 2008/0023583 A1 * | 1/2008 | Payen | ............... | B64C 1/062 |
| | | | | 244/17.11 |
| 2008/0173763 A1 * | 7/2008 | Morgia | ............... | B64D 37/26 |
| | | | | 244/135 R |
| 2010/0019088 A1 * | 1/2010 | Hoffjann | ............... | B64D 11/02 |
| | | | | 244/129.1 |
| 2011/0315821 A1 * | 12/2011 | Siboni | ............... | B64C 1/068 |
| | | | | 244/119 |
| 2012/0280054 A1 * | 11/2012 | Gomez | ............... | B64D 1/16 |
| | | | | 239/1 |
| 2013/0213044 A1 | 8/2013 | Lollini et al. | | |
| 2013/0284150 A1 * | 10/2013 | Lollini | ............... | B64D 37/00 |
| | | | | 123/446 |
| 2013/0320146 A1 * | 12/2013 | Basset | ............... | B64D 37/06 |
| | | | | 244/135 C |
| 2014/0144917 A1 * | 5/2014 | Meillat | ............... | B64D 37/22 |
| | | | | 220/567.2 |

FOREIGN PATENT DOCUMENTS

| | | | | |
|---|---|---|---|---|
| FR | 2933065 | | 1/2010 | |
| FR | 2947524 | | 1/2011 | |
| FR | 2957050 | | 9/2011 | |
| FR | 2984273 | | 6/2013 | |
| FR | 2991298 A1 * | 12/2013 | ............ | B64D 37/06 |
| FR | 2998549 A1 * | 5/2014 | ............ | B64D 37/22 |

* cited by examiner

ROTORCRAFT HAVING FUEL TANKS MOUNTED IN SUSPENSION UNDER A LOAD-BEARING MIDDLE FLOOR OF THE FUSELAGE OF THE ROTORCRAFT

CROSS REFERENCE TO RELATED APPLICATION

This application claims priority to French patent application No. FR 13 02559 filed on Nov. 5, 2013, the disclosure of which is incorporated in its entirety by reference herein.

BACKGROUND OF THE INVENTION (1) Field of the Invention

The present invention relates to arrangements concerning installing a supply of fuel on board a rotorcraft for the purpose of feeding fuel to at least one fuel-burning engine of the rotorcraft. The present invention relates more particularly to ways of mounting pouches on board a rotorcraft, which pouches form fuel tanks installed in the substructure of the fuselage of the rotorcraft.

(2) Description of Related Art

Rotorcraft are aircraft having one or more rotary wings including at least one main rotor of substantially vertical axis, and possibly also at least one rotor of substantially horizontal axis such as a tail rotor or a propulsive propeller. The rotor(s) of a rotorcraft are conventionally driven in rotation by a power plant comprising one or more fuel-burning engines, and in particular turboshaft engines.

The engines are fed individually with fuel by respective fuel circuits. For each fuel circuit, the fuel is delivered to an engine from a fuel tank installed on board the rotorcraft and serving to feed a given engine with fuel.

More particularly, a fuel feed unit of a power plant of a rotorcraft includes one or more fuel feed assemblies. In a single-engine rotorcraft, a single fuel feed assembly is provided for the single engine of the rotorcraft. In a rotorcraft having a plurality of engines, such as a twin-engine rotorcraft for example, the fuel feed assemblies are allocated respectively to each of the engines in order to enable them to operate independently.

Any given fuel feed assembly mainly comprises a fuel tank and a feeder that retains some minimum quantity of fuel. Depending on the ways in which the tank is installed on board the rotorcraft, the tank may comprise a single pouch or it may be made up of a plurality of distinct pouches that are put into fluid flow communication with one another. The feeder is formed by an enclosure that is independent with respect to free fluid flow communication for fuel between the tank and the feeder. The capacity of the feeder is limited to an amount that is sufficient to enable flight to continue for at least a predetermined duration in the event of a failure of the rotorcraft.

The fuel circuit for feeding fuel to the power plant takes fuel from inside the feeder in order to deliver it to the associated engine by means of a feed pump incorporated in the power plant and driven by the engine, and/or possibly by means of at least one booster pump immersed in the feeder. The feeder is fed with fuel from the tank by a fuel supply circuit making use of a supply pump associated with an ejector immersed in the tank. Such a supply pump may possibly be formed by a said booster pump. An overflow device restores excess fuel to the tank by allowing it to overflow from the feeder.

With a rotorcraft having a plurality of engines fed with fuel by respective fuel feed assemblies, the various tanks are placed in fuel flow communication with one another via a transfer circuit for transferring fuel from one tank to another. Such a transfer circuit makes use in particular of a transfer pump, which may be operated in order to balance the quantities of fuel contained in respective different tanks and/or in order to enable all of the on-board fuel to be used for feeding fuel to any one of the engines from the tank that is associated therewith.

By way of example, reference may be made to Document EP 2 567 896 (Eurocopter France), which describes such a fuel feed unit for a power plant of a rotorcraft.

There exists a problem of installing and maintaining the fuel feed unit. Clearly account needs to be taken not only of the arrangement of the fuel supply and the specific ways in which it is used, but also of the ways in which the various members included in such a fuel feed unit are arranged and operate.

In a known solution, as described in Document U.S. Pat. No. 5,451,015 (Bell Helicopter Textron Inc.), a compartment housing the supply of fuel is provided behind the cockpit of the rotorcraft vertically on the axis of rotation of the main rotor.

In another known solution as described by Documents FR 2 756 255 (Eurocopter France) and EP 2 567 896 (Eurocopter France), the supply of fuel is stored in fuel pouches arranged in respective compartments arranged in the substructure or bottom section (tub) of the fuselage of the rotorcraft. The various fuel pouches in a given said fuel feed assembly are in free fluid flow communication with one another via specific arrangements commonly referred to as "intercommunication".

With the fuel supply installed in such a configuration, the various fuel pouches of one or more tanks are placed under an equipment floor providing separation between the bottom section and the cabin of the rotorcraft. Such an equipment floor is supported in various ways by reinforcement fastened to the fuselage of the rotorcraft, so as to provide a loading surface inside the cabin of the rotorcraft that is located above compartments for receiving fuel pouches.

More particularly, such equipment floors in an aircraft are commonly fastened to load-carrying members mounted on the fuselage of the aircraft. By way of example, such load-carrying members are constituted by beams, cross-members, and/or support legs supported by the fuselage. By way of example, reference may be made on this topic to the following Documents FR 2 933 065 (Airbus France SAS), FR 2 957 050 (EADS France), FR 2 984 273 (Aerolia SAS), and FR 2 947 524 (Airbus Operations SAS), which describe various ways of mounting such an equipment floor on board an aircraft.

The solution of placing tanks in the bottom section of a rotorcraft makes it possible to have a considerable volume for installing the fuel supply. The quantity of fuel loaded on board is advantageously optimized while also obtaining natural balancing of the weight of on-board fuel relative to the axis of rotation of the main rotor of the rotorcraft that essentially provides the rotorcraft with lift. This constant search to carry an optimized quantity of fuel on board a rotorcraft is mentioned in Document U.S. Pat. No. 3,966,147 (Grumman Aerospace Corp.).

Furthermore, an advantage of placing tanks in the bottom section of a rotorcraft makes it possible to keep the tanks as far away as possible from the power plant. These arrangements serve to improve safety of the aircraft in terms of carrying fuel, since the fuel is located at a distance from a sensitive zone of the rotorcraft including the main rotor of the rotorcraft and the power plant, which generates heat.

It is also known to install fuel tanks laterally outside the fuselage of a rotorcraft, which tanks are carried by the fuselage. On this topic, reference may be made for example to Document U.S. Pat. No. 4,860,972 (Era Aviat. Inc.) and to above-mentioned Document U.S. Pat. No. 3,966,147 (Grumman Aerospace Corp.).

Nevertheless, and in general, installing and maintaining the supply of fuel inside the fuselage of a rotorcraft remain difficult. The volume available in a rotorcraft that is used for transporting people and freight needs to be maximized, to the detriment of easy access to compartments providing equipment space such as the compartments housing the supply of fuel. Consequently, the compartments for receiving fuel pouches are often difficult for an operator to access.

On this topic, reference may be made to Document U.S. Pat. No. 5,371,935 (United Tech. Corp.) which relates to such difficulties of access to compartments for receiving fuel pouches, or indeed to the above-mentioned Document U.S. Pat. No. 3,966,147 (Grumman Aerospace Corp.), which proposes avoiding such access difficulties by mounting main fuel tanks laterally outside the fuselage.

Specifically, easy access to compartments for receiving fuel pouches depends on the actual structure of the fuselage of the rotorcraft. Rotorcraft fuselages are essentially made up of stiffener members for stiffening a covering, which members are arranged and fastened together so as to impart a desired shape to the fuselage. The stiffener members and more or less locally the covering are mechanically load-bearing relative to the general forces supported by the fuselage.

In order to shape the fuselage, each transverse stiffener member is formed by a frame that locally defines the transverse profile of the fuselage. Such frames, which may be distinct structures of distinct shapes, are typically spaced apart from one another in the longitudinal direction of the fuselage between the front and the rear of the rotorcraft. Longitudinal stiffeners such as folded or extruded section members, referred to as "stingers" or as "longerons", stabilize the covering and the framework of the fuselage.

Conventionally, said general forces supported by the fuselage are generated amongst other things at least by the lift and the propulsion of the rotorcraft. A load-bearing top floor is anchored to at least two middle frames that longitudinally define a middle segment of the fuselage lying between a cockpit and a tail boom of the rotorcraft. The top floor forms a top wall of the fuselage, extending at least in part along said middle segment and it supports the main rotor via a main gearbox (MGB), together with at least part of the power plant.

Also conventionally when the supply of fuel is housed in the substructure of the fuselage of the rotorcraft, said general forces supported by the fuselage may possibly be generated by the weight of fuel contained in the fuel pouches. As a result, fuel pouches are conventionally supported by the bottom face of the rotorcraft, or rotorcraft belly, which is formed by the covering of the fuselage.

In this context, it is necessary to provide hatches in the equipment floor in order to enable an operator to access the compartments arranged in the bottom section of the rotorcraft for receiving fuel tanks Nevertheless, the use of such hatches is awkward and special provisions must be arranged to facilitate access to the tank by an operator, such as for example in the manner described in Document U.S. Pat. No. 5,371,935 (United Tech. Corp.).

Furthermore, a drawback of receiving the tanks in the bottom section of the fuselage lies in difficulties of providing various passages for fuel, such as from one tank to another, from one pouch to another within a single tank, and/or between the feeders and the respective tanks that are associated therewith.

Such fuel passages involve weakening the frames through which said passages need to be provided. Since the frames are structures that need to provide the strength desired for the fuselage relative to the general forces to which it is subjected, weakening the frames requires them to be specially reinforced, consequently increasing their weight and making their structure more complex.

Furthermore, account needs to be taken of a situation in which the rotorcraft is involved in a crash, in order to protect personnel and goods on board the rotorcraft. Installing tanks in compartments of the fuselage makes such protection difficult, as mentioned by the above-mentioned Document U.S. Pat. No. 3,966,147 (Grumman Aerospace Corp.).

Account also needs to be taken of the constant search in aviation for simplifying equipment on board an aircraft, in particular for the purposes of reducing its weight and simplifying maintenance operations.

It should naturally be understood that the concepts of "vertical", "horizontal", "longitudinal", "transverse", "front", "rear", "bottom", "top", and "overlying" are relative terms to be understood relative to the situation of the rotorcraft when standing on the ground and to the long direction of the fuselage between the front and the rear of the rotorcraft. Such concepts are commonly understood by the person skilled in the art.

Furthermore, in the context of a rotorcraft fuselage, the concept of "load-bearing" and "non-load-bearing" are concepts qualifying members of the rotorcraft in widespread use by the person skilled in the art, such concepts specifying whether members of the fuselage do or do not bear loads relative to the general forces to which the fuselage is subjected.

The person skilled in the art is continuously searching for ways to organize how the unit for feeding fuel to one or more engines of a rotorcraft is to be installed onboard the rotorcraft in the light of a multitude of problems to be solved and of difficulties to be overcome. The person skilled in the art is continuously searching for solutions that provide a satisfactory compromise between the various drawbacks and advantages associated with such solutions.

BRIEF SUMMARY OF THE INVENTION

An object of the present invention is to provide a rotorcraft having a unit for feeding fuel to a power plant of the rotorcraft that itself includes at least one fuel-burning engine.

The object of the present invention lies in the above-mentioned search for a compromise and it seeks in particular to propose ways of implanting such a fuel feed unit on board a rotorcraft to procure a solution that is satisfactory in terms of such a compromise.

The rotorcraft of the present invention is fitted with a unit for feeding fuel to a power plant of the rotorcraft, the power plant including at least one fuel-burning engine. The rotorcraft has a fuselage extending longitudinally between the front and the rear of the rotorcraft and made up of stiffener members for stiffening a covering. The stiffener members and the covering are conventionally load-bearing relative to the general forces supported by the fuselage.

The stiffener members comprise at least a longitudinal succession of transverse frames locally defining the transverse profile of the fuselage, together with longitudinal stiffeners of the covering. The stiffener members also include at least one top floor securely engaged with at least two of said frames, referred to as middle frames. Such middle frames are contained in a middle segment of the fuselage between a cockpit and a tail boom.

Said top floor is conventionally load-bearing relative to the general forces supported by the fuselage, carrying at least the main rotor of substantially vertical axis that provides the rotorcraft at least with lift.

Said fuel feed unit comprises at least one fuel feed assembly for an engine of the power plant, each of said at least one fuel feed assembly(ies) comprising at least:

a fuel tank comprising in particular at least one fuel pouch. Said tank is installed inside at least one bottom compartment of the fuselage situated under a middle floor. Such a middle floor is a floor serving at least to separate the bottom compartment from at least one top compartment forming cabin space of the rotorcraft; and a feeder immersed in the tank. Said feeder has at least one circuit for supplying it with fuel from the tank and a circuit for feeding fuel from the feeder to the engine associated with the fuel feed assembly.

According to the present invention, said middle floor is mounted in secure engagement with all or some of the frames of the middle segment, and at least with two middle frames, and it is load-bearing relative to the general forces supported by the fuselage. The bottom compartment does not have said covering over the bottom face of the fuselage. The bottom face of the fuselage is open to the outside, thereby providing the bottom compartment with an open bottom that is open to the outside of the fuselage. The tank is carried in suspension from the bottom face of the middle floor, said middle floor also forming a member for anchoring the tank in suspension that is accessible from outside the fuselage via said open bottom.

Making the middle floor a floor that is load-bearing relative to the general forces supported by the fuselage makes it possible to use an advantageous arrangement for mounting the fuel feed unit on board the rotorcraft. Specifically, it makes it possible for the bottom compartment to have an open bottom via the bottom face of the fuselage that does not have any covering.

Access through said open bottom to the bottom compartment and to the anchor means for suspending the tank from the middle floor is made easy. Such easy access to the bottom compartment facilitates installing and/or removing the tank for an operator, and also facilitates operations of maintaining the fuel feed assembly.

The solution proposed by the invention makes it possible, for installing the fuel feed unit on board the rotorcraft and in particular for installing the tank in the bottom compartment, to avoid the conventional removal and replacement of at least one hatch included in the middle floor or indeed removing or reinstalling the entire middle floor, it being recalled that the middle floor is conventionally formed by an equipment floor that is not load-bearing.

Furthermore, the operation of installing the fuel feed unit on board the rotorcraft can be performed on an assembly line for the rotorcraft independently of other operations of assembling the component members of the rotorcraft.

The frames are kept in shape by their top portions extending between the top floor and the middle floor independently of any extension of the frames from the bottom floor and into the bottom zone for providing the fuselage with a side wall arranged in particular as a skirt defining the bottom compartment.

Said open bottom may be arranged in the bottom face of the fuselage without affecting the strength of the frames relative to the general forces supported overall by the fuselage.

In addition, the frames, and more particularly the frames securely engaged with the middle floor, need not have respective bottom transverse bars for stiffening them and holding them in shape. As a result, the inside volume of the bottom compartment can be free from any obstacle that might be formed by such a frame bottom bar, thereby enabling the tank to be arranged freely inside the bottom compartment along its longitudinal extent.

The tank may extend continuously as a single pouch along the bottom compartment, so as to avoid the constraint of providing intercommunication means between the various distinct pouches that conventionally make up a single tank, which means are individually arranged between two longitudinally adjacent frames.

In addition, the fuel supply circuit for the feeder and/or optionally at least one circuit for transferring fuel between a plurality of tanks associated respectively with feeding fuel to different engines in the power plant can be arranged freely and easily, in particular while avoiding any weakening of the frames and simplifying the respective structures of the tanks and/or of said circuits.

Specifically, the longitudinal continuity of the inside volume of the bottom compartment makes it possible to avoid weakening the frames in the usual way by forming openings through them to provide passages for fuel from one zone to another in the bottom compartment defined between two longitudinally adjacent frames, with such frames then conventionally being reinforced in order to mitigate such weakening.

Furthermore, opening the bottom face of the fuselage in order to provide the open bottom facilitates ventilating and draining the bottom compartment housing the tank, thereby easily improving the safety of the rotorcraft in the event of any unwanted escape of gas or even fuel from the tank.

In particular, the bottom compartment is defined between the middle floor and a side skirt arranged in the substructure of the fuselage to extend the covering. These provisions are such that said open bottom is defined between the free bottom edges of the skirt.

The skirt is held in shape in particular by the vertical extensions of the lateral uprights of the middle frames extending from the middle floor. The skirt is potentially provided with members for reinforcing it against bending of its walls, in particular of its longitudinal walls. Such reinforcing members may for example be arranged as respective box beams located at the margins of the open bottom of the bottom compartment leading to the outside of the fuselage.

Such extensions of the uprights of the middle frames and/or such reinforcing members are not load-bearing relative to the general forces supported by the fuselage. As a result, said extensions need not have one or more cross-members that could constitute unwanted longitudinal obstacles inside the bottom compartment, as are conventionally constituted by the bottom transverse bars of the frames.

Preferably, the bottom compartment is fitted with stabilizer means for stabilizing the suspended support of the tank by the middle floor. Such stabilizer means are advantageously formed by transverse plates formed at the bases of at least one pair of said frames and engaged in slots formed in the top wall of the tank.

Such plates, which are not load-bearing relative to the general forces supported by the fuselage, may possibly extend at least in part if not in full across the transverse dimension of the fuselage so as to interconnect two transversely opposite uprights of a given frame.

In an embodiment, said slots are formed in the top wall of the tank providing vertical partitioning of the tank to separate its inside volume into a plurality of longitudinally successive chambers. Passages for passing fuel between two adjacent chambers of a given tank may easily be provided at the bottom of the tank at the bases of the partitioning. Such provisions make it simple to provide intercommunication between the various chambers of a given tank.

It can be seen that the tank may advantageously be stiffened by the plates received in the slots, said plates forming reinforcing elements that avoid any deformation of the tank, which may be constituted by a flexible pouch.

In a preferred embodiment, the feeder is placed in a longitudinally middle chamber of the tank arranged between two adjacent frames. Said longitudinally middle chamber is preferably provided substantially vertically below the main rotor of the rotorcraft, on its axis of rotation, and between said two middle frames.

In an embodiment in which the fuel feed unit comprises a plurality of said fuel feed assemblies, the respective tanks of said fuel feed assemblies are in fluid flow communication with one another via a fuel transfer circuit extending transversely between the tanks and provided between two adjacent frames.

Such a fuel transfer circuit may advantageously be arranged between the respective feeders of said fuel feed assembly.

Preferably, the tank includes a bottom wall incorporating slopes for draining fuel by gravity towards an opening of the supply circuit through which the fuel is taken for delivery to the feeder, said opening advantageously being provided by an ejector. Such provisions make it possible to drain all of the fuel from inside the tank to the fuel supply circuit, thus avoiding the need for any special arrangement of the bottom compartment.

By way of example, said slopes are arranged by incorporating blocks of cellular material in the tank, which blocks impart a locally floating shape to said bottom wall.

The tank may equally well be arranged as a pouch that is flexible in use or as a pouch that is more rigid and that naturally stays in shape. Specifically, the access from the outside of the rotorcraft to its bottom compartment made possible via its open bottom makes it possible to use a tank that is rigid without making it more difficult to install and/or remove.

It can be seen that in an embodiment, the bottom wall of the fuselage in the zone of the bottom compartment may potentially be formed at least in part by a bottom wall of the tank closing the open bottom, such that the bottom of the tank is used to constitute at least part of the belly of the rotorcraft.

In an embodiment, the bottom wall of the fuselage in the zone of the bottom compartment is formed at least in part by a removable wall for shutting the open bottom, e.g. arranged as a cap. Clearly such a removable wall is not load-bearing relative to the general forces supported by the fuselage.

In the event of the rotorcraft crashing, the middle floor constitutes a shield for protecting the top compartment against intrusion of the tank and/or of various members of the fuel feed unit housed in the bottom compartment.

The means for anchoring the tank in suspension are advantageously of simple structure, e.g. being formed by attachment members secured to the middle floor and co-operating with straps fitted to the tanks.

In an advantageous embodiment, the anchor means may potentially be provided with rupture means for breaking the co-operation between the anchor members and the straps, e.g. that operate spontaneously at a predetermined force threshold and/or under the control of the pilot of the rotorcraft acting on such rupture means. Such rupture means may potentially be arranged as means known to the person skilled in the art of the kind conventionally making it possible in the event of a rotorcraft crash to jettison a fuel tank, e.g. one mounted on the outside of the fuselage.

Since the bottom face of the bottom compartment is open to the outside, using such rupture means enables the tank to be jettisoned through said opening, in particular in the event of the rotorcraft crashing.

BRIEF DESCRIPTION OF THE SEVERAL VIEWS OF THE DRAWINGS

The embodiments of the present invention are described with reference to the figures of the accompanying sheets, in which.

DETAILED DESCRIPTION OF THE INVENTION

Figures 1, 2, 6:
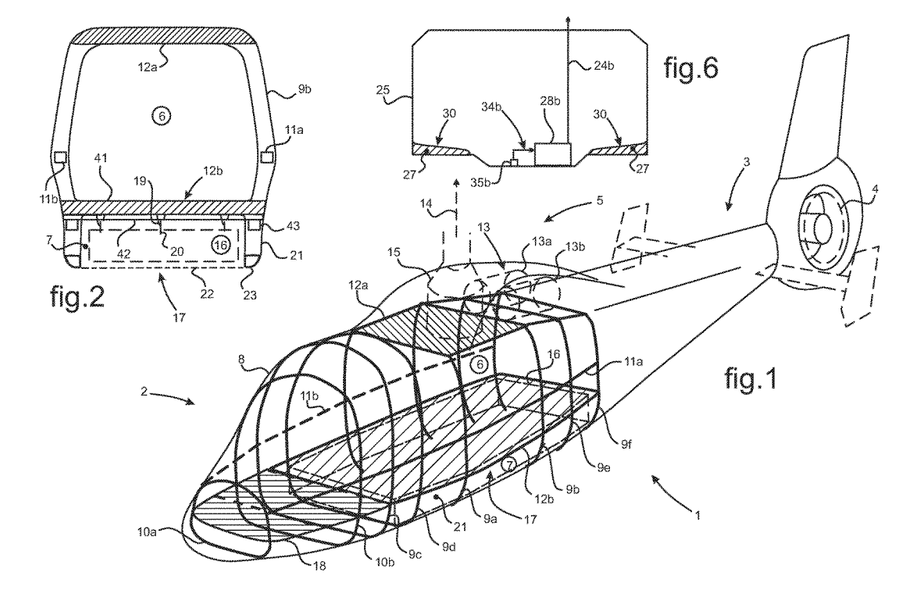
FIGS. 1 and 2 are views of a rotorcraft fuselage carrying a suspended fuel supply in an embodiment of the invention, shown respectively in perspective and in middle cross-section.
FIG. 6 is a diagram of a fuel reserve fitted to a rotorcraft as shown in FIGS. 1 and 2.

In FIG. 1, a rotorcraft 1 comprises longitudinally a cockpit 2 situated at the front and a tail boom 3 carrying a rear anti-torque device, such as a tail rotor 4, for example. The cockpit 2 and the tail boom 3 are spaced apart longitudinally from each other by a middle segment 5 of the fuselage of the rotorcraft 1. The middle segment 5 is partitioned by a middle floor 12b providing a top compartment 6 forming a cabin space and a bottom compartment 7 forming an equipment space.

The fuselage of the rotorcraft 1 extends longitudinally between the front and the rear of the rotorcraft 1 and it is formed mainly by members for stiffening a covering 8. Such stiffener members and the covering 8 are commonly load-bearing relative to the general forces supported by the fuselage. Conventionally, the stiffener members comprise transverse frames 9a-9f (9a, 9b, 9c, 9d, 9e, 9f) and 10a, 10b for example, which locally define the transverse profile of the fuselage of the rotorcraft 1, while being arranged longitudinally in succession so as to be spaced apart from one another. Longitudinal stiffeners 11a, 11b are constituted for example by stringers that stabilize the covering, and/or they are formed by longerons.

The stiffener members also comprise a pair of floors 12a, 12b secured to at least two frames of the middle segment 5, referred to as middle frames 9a, 9b. One of said floors is constituted by the middle floor 12b and the other of said floors is constituted by a top floor 12a overlying said middle floor 12b, at least in part. The longitudinal extent of the middle floor 12b is preferably optimized for increasing as much as possible the volume available in the bottom compartment 7.

Traditionally, the top floor 12a carries a vertical-axis main rotor 14 of the rotorcraft 1, in particular via a main gearbox (MGB) 15. The rotorcraft 1 has a power plant 13 comprising at least one engine 13a-13b for providing the rotorcraft with the mechanical power it needs to operate, and in particular the mechanical power needed for driving the rotors 4, 14.

The power plant 13 is commonly mounted on the top floor 12a. In the embodiment shown, the rotorcraft 1 has two engines 13a, 13b. Nevertheless, it should be understood that the invention is equally applicable to a rotorcraft having a single engine or to a rotorcraft having more than two engines.

In the embodiment shown, the middle floor 12b extends along the entire length of the middle segment 5, being extended under the cockpit by an equipment floor 18 that is not load-bearing relative to the general forces supported by the fuselage. Such an equipment floor 18 is conventionally carried by the frames 10a, 10b of the cockpit 2, or indeed by a front frame 9c of the middle segment 5, via non-load-bearing support members that are typically arranged as props, cross-members, and/or longerons, for example.

In FIGS. 1 and 2, the bottom compartment 7 of the fuselage is dedicated to receiving a fuel supply 16 for enabling the power plant to be fed with fuel. The middle floor 12b is used for carrying the fuel supply 16 in suspension, thereby making it possible, by virtue of its load-bearing nature, to leave the bottom face of the fuselage without any covering 8 so as to provide the bottom compartment 7 with a bottom 17 that is open to the outside of the rotorcraft 1.

In FIG. 2, the fuel supply 16 is suspended from the middle floor 12b by anchor means associating attachment members 19 co-operating with straps 20 fitted to at least one tank of the fuel supply 16. The attachment members 19 are securely engaged with the bottom face of the middle floor 12, with such secure engagement possibly being implemented by attachment members 19 being incorporated in or fastened to the bottom face of the middle floor 12b.

The bottom compartment 7 is defined between the middle floor 12b and a side skirt 21 of the fuselage arranged to extent the covering 8 vertically. The skirt 21 is held in shape by the upright bars of the frames of the middle segment 5, being provided with reinforcing members 23 to enhance support and shaping, in particular against any transverse bending. The reinforcing members 23 are arranged as box beams fitted to the bottom of the skirt 21 at the margin of the open bottom 17 of the bottom compartment 7. The skirt 21 is open in its bottom face so as to define between its free bottom edges the open bottom 17 of the bottom compartment 7 that is open to the outside of the rotorcraft. Said open bottom 17 may optionally be closed by a removable wall 22 fastened in easily reversible manner to the fuselage. Such a removable wall 22, which is not load-bearing relative to the forces supported by the fuselage, may example be arranged as a cover for closing the open bottom 17.

Figure 3:
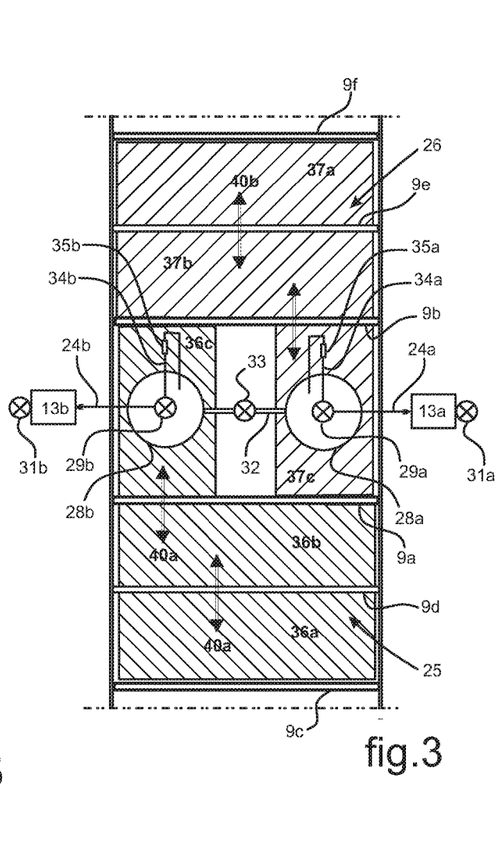
FIG. 3 is a plan view of a fuel supply made up of a plurality of tanks fitted to the rotorcraft shown in FIGS. 1 and 2.
Figure 4:
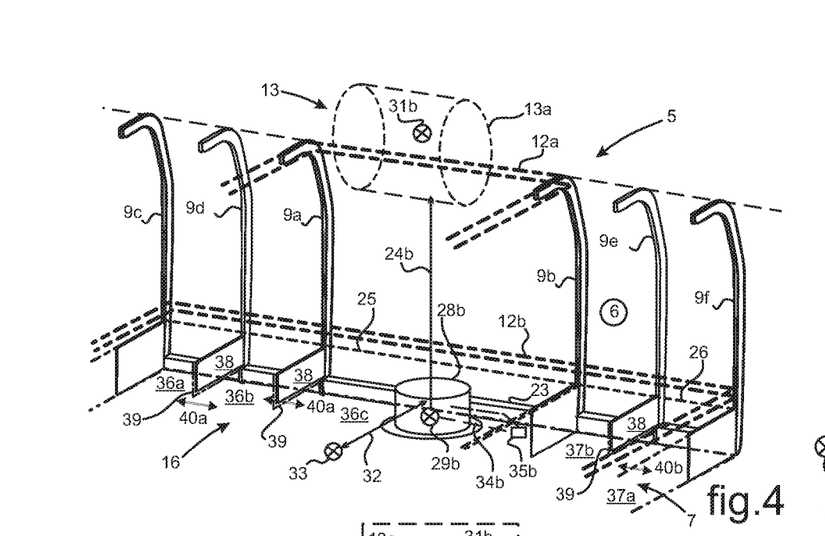
FIGS. 4 and 5 are fragmentary views of the fuselage of the rotorcraft shown in FIGS. 1 and 2, housing a fuel supply in its substructure, respectively in a cutaway perspective view and in a longitudinal section view.
Figure 5:
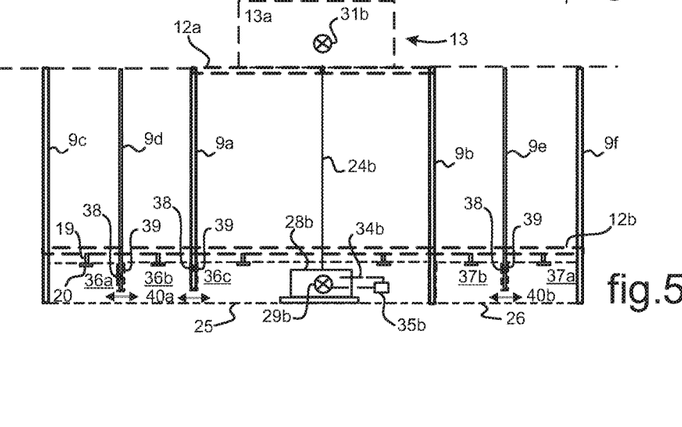

In FIGS. 3 to 5, the engines 13a, 13b of the power plant 13 are respectively fed with fuel from the fuel supply 16 by feed circuits 24a, 24b that are respectively allocated thereto.

In FIG. 3, the fuel supply is subdivided into a plurality of tanks 25, 26 that are respectively allocated to feeding the engines 13a, 13b with fuel via the feed circuits 24a, 24b. FIG. 3 shows two fuel feed assemblies for feeding the respective engines 13a, 13b of the power plant, while FIGS. 4 and 5 are cutaway longitudinal views showing only one of said fuel feed assemblies.

In FIGS. 3 to 5, each fuel feed assembly for a given engine 13a, 13b comprises a tank 25, 26 housing therein a feeder 28a, 28b. Each of the tanks 25, 26 is formed by a single pouch. A first tank 25 extends from the front towards a longitudinally middle zone of the bottom compartment 7, and a second tank 26 extends from the rear towards said longitudinally middle zone of the bottom compartment 7. Means for stabilizing the suspended support of the tanks 25, 26 are provided between the frames 9a-9f and the tanks 25, 26.

More particularly, in FIGS. 4 and 5, each of the frames 9a-9f includes at its base transverse plates 38 co-operating by mutual engagement with slots 39 formed in the top walls of the tanks 25, 26. Such plates 38 received in the slots 39 extend vertically and transversely. The slots 39 are formed in the top walls of the tanks 25, 26, advantageously being formed by folds in the top walls of the tanks 25, 26.

The slots 39 form internal vertical partitions inside the tanks 25, 26, subdividing the volume of a given tank 25, 26 into a plurality of longitudinally successive chambers 36a, 36b, 36c; 37a, 37b, 37c. The transverse extent of the plates 38, or of the slots 39, may potentially be limited, since the plates do not constitute load-bearing members of the framework. Such plates 38 and slots 39 form said means for stabilizing the suspended support of the tanks 25, 26.

In order to maintain a free flow of fuel between the various chambers 36a, 36b, 36c; 37a, 37b, 37c within a given tank 25, 26, fuel passages 40a, 40b are provided between the chambers in the bases of the tanks 25, 26. For this purpose, and in the embodiment shown, the plates 38 and the slots 39 extend over part of the vertical extent of the tanks 25, 26 so that said passages 40a, 40b are provided between the bottoms of the slots 39, and the bottoms of the tanks 25, 26. In another embodiment that is not shown, each of said passages 40a, 40b is formed by at least one orifice and/or one duct provided through the plates 38, which plates then extend to the bases of the frames 9a-9f.

Intercommunication between the various chambers 36a, 36b, 36c; 37a, 37b, 37c of a given tank 25, 26 is thus provided simply by means of said passages 40a, 40b formed by the chambers 36a, 36b, 36c; 37a, 37b, 37c opening out to one another beside the bases of the tanks 25, 26.

Respective middle chambers 36c, 36c of the tanks 25, 26 are placed transversely side by side, substantially vertically below the main rotor, each housing the feeder 28a, 28b associated therewith. Booster pumps are potentially immersed in each of the feeders 28a, 28b for taking fuel and delivering it to the corresponding engine 13a, 13b.

Supply pumps 29a, 29b are used to supply the feeders 28a, 28b with fuel via supply circuits 34a, 34b conventionally making use of ejectors 35a, 35b immersed in the respective tanks 25, 26 that are associated with the feeders 28a, 28b. In the embodiment shown, such supply pumps 29a, 29b may potentially be formed by said booster pumps.

Feed pumps 31a, 31b for feeding the engines 13a, 13b with fuel are driven by the respective engines 13a, 13b associated therewith. Conventionally, when using said booster pumps, the feed pumps 31a, 31b act as relays to the booster pumps.

The feeders 28a, 28b are arranged in fluid flow communication with each other via a transfer circuit 32 making use of a transfer pump 33. Such a transfer circuit 32 is typically used, when necessary, for transferring fuel from a fuel feed assembly associated with one of the engines 13a, 13b to the fuel feed assembly associated with another one of the engines 13a, 13b.

It can be seen that the architecture for mounting the feed unit in a structure that is simple with the capacity for loading an optimized volume of fuel. In addition, the following advantages should be observed:

continuity of the inside volumes of the tanks 25, 26 is provided by the intercommunication between the chambers 36a, 36b, 36c; 37a, 37b, 37c of a given tank 25, 26 arranged in the form of said fuel passages 40a, 40b located at the bases of the stabilizer means 38, 39. Such an arrangement of said intercommunication avoids weakening the frames 9a-9f that do not possess bottom bars, because the middle floor 12b is designed to be load-bearing. Specifically, as is common practice in the field of rotorcraft, the usual means providing communication between the various distinct pouches making up a single tank received in the substructure of the fuselage involve weakening the frames and more particularly their bottom bars, and as a consequence the frames need to be reinforced;

access to the bottom compartment 7 is made available from the outside of the fuselage through said opening bottom 17. Such access makes it easier for an operator to access the tanks 25, 26 and the various circuits 24a, 24b; 34a, 34b; 32 making up the fuel feed unit. This facilitates installing and maintaining the tanks 25, 26;

the bottom compartment 7 is ventilated, thereby making safe the rotorcraft in the event of gas being given off by the fuel feed unit, with this being obtained in simple manner because of the bottom 17 of the bottom compartment 7 being open to the outside of the fuselage and providing such ventilation. The bottom compartment 7 need not be provided with special arrangements for ventilating it; and in the event of the rotorcraft crashing, and in comparison with a mere equipment floor, the cabin space of the rotorcraft 1, comprising both the cockpit 2 and the top compartment 6, is better protected by the middle floor 12b against intrusion of members making up the fuel feed unit or indeed other members of the rotorcraft such as landing gear, or even elements outside the rotorcraft 1.

By way of example, in FIG. 2, the middle floor 12b is shown as being made up of load-bearing panels 41 carried by load-bearing cross-members 42 securely engaged with the fuselage frames, e.g. by load-bearing longerons 43 interconnecting the cross-members 42. The panels 41 may potentially be fastened by rivets to said cross-members 42 and/or said longerons 43, preferably being embedded at their edges in channels formed at least in said cross-members 42 if not also in said longerons 43. Such embedding of the panels serves to reinforce the middle floor 12b, thereby making it stronger overall against the general forces supported by the fuselage and more particularly against the weight of fuel loaded on board the rotorcraft 1 by suspending the tank(s) 25, 26.

In another embodiment, said panels 41 are preferably constituted by laminated panels arranged as honeycomb panels reinforced by at least one reinforcing layer of composite material incorporating multidimensional fibers embedded in a resin matrix.

In FIG. 6, a tank 25 of a fuel feed assembly of a rotorcraft 1, e.g. of the kind shown in FIG. 1, is conventionally arranged as a flexible pouch. In its bottom, the tank 25 incorporates blocks 27 of cellular material providing slopes 30 for draining fuel towards the ejector 35b of the circuit 34b for supplying fuel to the corresponding feeder 28b.

It can be understood that reference numbers that are common to two or more figures correspond to the same members of the rotorcraft and in particular of the fuel feed unit that it incorporates, such members identified by such common reference numbers potentially not being shown in all of the figures.

What is claimed is:

1. A rotorcraft having a fuel feed unit for a power plant of the rotorcraft, the power plant including at least one fuel-burning engine, the rotorcraft including a fuselage extending longitudinally between the front and the rear of the rotorcraft and made up of members stiffening a covering and comprising at least:
a longitudinal succession of transverse frames locally defining a transverse profile of the fuselage, together with longitudinal stiffeners for stiffening the covering; and
a top floor securely engaged with at least two of the frames, referred to as middle frames, forming part of a middle segment of the fuselage located between a cockpit and a tail boom, the top floor carrying at least one main rotor of substantially vertical axis for providing the rotorcraft at least with lift;
the fuel feed unit including at least one assembly for feeding the engine of the power plant with fuel, the at least one fuel feed assembly comprising at least:
a fuel tank installed inside at least one bottom compartment of the fuselage situated under a middle floor separating the bottom compartment from at least one top compartment forming cabin space of the rotorcraft; and
a feeder immersed in the tank, said feeder having at least one supply circuit for supplying the feeder with fuel from the tank and having a feed circuit for feeding the at least one engine with fuel from the feeder to the at least one engine associated with the fuel feed assembly;
wherein the middle floor is a load-bearing floor securely engaged with at least the two middle frames, the bottom compartment being free of the covering over a bottom face of the fuselage, which is open to the outside, thereby providing the bottom compartment with an open bottom that is open to the outside of the fuselage, the tank being suspended from the bottom face of the middle floor that forms a suspension anchor member for the tank, the tank being accessible from outside the fuselage via the open bottom, wherein the bottom compartment is fitted with stabilizer means for stabilizing the suspended support of the tank by the middle floor, the stabilizer means being formed by transverse plates formed at the bases of at least one pair of the frames and engaged in slots formed in the top wall of the tank.

2. The rotorcraft according to claim 1, wherein the bottom compartment is defined between the middle floor and a side skirt arranged in a substructure of the fuselage to extend the covering, the open bottom being defined between the free bottom edges of the skirt.

3. The rotorcraft according to claim 1, wherein the slots are formed in the top wall of the tank providing vertical partitioning of the tank to separate its inside volume of the tank into a plurality of longitudinally successive chambers, passages for passing fuel between two adjacent chambers of a given tank being provided at the bottom of the tank at the bases of the partitioning.

4. The rotorcraft according to claim 3, wherein the feeder is placed in a longitudinally middle chamber of the tank arranged between two adjacent frames.

5. The rotorcraft according to claim 1, wherein the fuel feed unit comprises a plurality of the fuel feed assemblies, and the respective tanks of the fuel feed assemblies are in fluid flow communication with one another via a fuel transfer circuit extending transversely between the tanks and provided between two adjacent frames.

6. The rotorcraft according to claim 4, wherein the fuel feed unit comprises a plurality of the fuel feed assemblies, and the respective tanks of the fuel feed assemblies are in fluid flow communication with one another via a fuel transfer circuit extending transversely between the tanks and provided between two adjacent frames, and wherein the fuel transfer circuit is arranged between the respective feeders of the fuel feed assembly.

7. The rotorcraft according to claim 1, wherein the tank includes a bottom wall incorporating slopes for draining fuel by gravity towards an opening of the supply circuit through which the fuel is taken for delivery to the feeder.

8. The rotorcraft according to claim 7, wherein the slopes are arranged by incorporating blocks of cellular material in the tank, which blocks impart a locally sloping shape to the bottom wall.

9. The rotorcraft according to claim 1, wherein the bottom wall of the fuselage in the zone of the bottom compartment is formed at least in part by a bottom wall of the tank closing the open bottom.

10. The rotorcraft according to claim 1, wherein the bottom wall of the fuselage in the zone of the bottom compartment is formed at least in part by a removable wall for shutting the open bottom.

11. The rotorcraft according to claim 1, wherein the middle floor constitutes a shield for protecting the top compartment against intrusion of the tank.

12. The rotorcraft according to claim 1, wherein means for anchoring the tank in suspension are formed by attachment members secured to the middle floor and co-operating with straps fitted to the tanks.

13. The rotorcraft according to claim 12, wherein the anchor means are rupturable breaking the co-operation between the anchor members and the straps, thereby allowing the tank to be jettisoned in the event of the rotorcraft crashing.

14. A rotorcraft having a fuel feed unit for a power plant of the rotorcraft, the power plant including a fuel-burning engine, the rotorcraft including a fuselage extending longitudinally between the front and the rear of the rotorcraft and comprising a covering and members for stiffening the covering, the rotorcraft comprising:
  a longitudinal succession of transverse frames locally defining a transverse profile of the fuselage, together with longitudinal stiffeners for stiffening the covering; and
  an upper floor securely engaged with at least two of the frames, forming at least part of a middle segment of the fuselage located between a cockpit and a tail boom, the upper floor carrying at least one main rotor for providing the rotorcraft at least with lift;
  the fuel feed unit including a fuel feed assembly for feeding the engine with fuel,the fuel feed assembly comprising:
  a fuel tank suspended by at least one load-bearing attachment member inside a lower compartment of the fuselage situated under a middle floor separating the lower compartment from an upper compartment forming cabin space of the rotorcraft therebetween; and
  a feeder immersed in the tank, the feeder having at least one supply circuit for supplying the feeder with fuel from the tank and having a feed circuit for feeding the engine with fuel from the feeder;
  wherein the lower compartment is fitted with at least one non-load-bearing plates for stabilizing the suspended support of the tank by the middle floor and serving as a reinforcing element to stiffen the tank and prevent deformation in shape;
  wherein the middle floor is a load-bearing floor securely engaged with the at least two of the frames, the lower compartment being free of the covering over a lower face of the fuselage, which is open to an exterior of the fuselage, thereby providing the lower compartment with an open bottom that associates the exterior with an interior of the fuselage, the tank being suspended interiorly from a lower face of the middle floor that forms a suspension anchor member for the tank, the tank being located within the lower compartment and accessible from the exterior of the fuselage via the open bottom.

15. The rotorcraft of claim 14, wherein the middle floor further comprises load-bearing panels carried by load-bearing cross-members securely engaged with the transverse frames, the panels being embedded in channels formed at least in the cross members.

16. A rotorcraft having a fuel feed unit for a power plant of the rotorcraft, the power plant including a fuel-burning engine, the rotorcraft including a fuselage extending longitudinally between the front and the rear of the rotorcraft and having a covering, the rotorcraft comprising:
  a longitudinal succession of transverse frames locally defining a transverse profile of the fuselage, together with longitudinal stiffeners for stiffening the covering; and
  an upper floor securely engaged with at least two middle frames of the succession of transverse frames to form at least part of a middle segment of the fuselage located between a cockpit and a tail boom, the upper floor carrying at least one main substantially vertical rotor;
  the fuel feed unit including a fuel feed assembly for feeding the engine with fuel, the fuel feed assembly comprising:
  a fuel tank suspended by at least one attachment member inside at least one lower compartment of the fuselage situated under a middle floor separating the at least one lower compartment from at least one upper compartment forming cabin space of the rotorcraft therebetween; and
  a feeder disposed in the tank, the feeder having at least one supply circuit for supplying the feeder with fuel from the tank and having a feed circuit for feeding the engine with fuel from the feeder;
  a plurality of plates cooperating with the transverse frames and an upper wall of the tank to inhibit relative movement of the fuselage and the tank;
  wherein the middle floor is a load-bearing floor securely engaged with the at least two middle frames, the lower compartment being free of the covering over a lower face of the fuselage, which is open to the outside, thereby providing the lower compartment with an open bottom that is open to the outside of the fuselage, the tank being suspended from the lower face of the middle floor that forms a suspension anchor member for the tank, the tank being accessible from outside the fuselage via the open bottom.

17. The rotorcraft of claim 16, wherein the plurality of plates comprises transverse plates extending from the transverse frames and engaged in slots, the slots formed by folds in the upper wall of the tank.

18. The rotorcraft of claim 17, wherein the transverse plates extend to the bases of the transverse frames and provide vertical partitioning to separate the inside volume of the tank into a plurality of longitudinally successive chambers, with fuel allowed to pass between adjacent chambers of the tank through orifices or ducts in the plates.

19. The rotorcraft according to claim 14, wherein the lower compartment is defined between the middle floor and a side skirt arranged in a substructure of the fuselage to extend the covering, the open bottom being defined between the free bottom edges of the skirt.

20. The rotorcraft according to claim 16, wherein the lower compartment is defined between the middle floor and a side skirt arranged in a substructure of the fuselage to extend the covering, the open bottom being defined between the free bottom edges of the skirt.

* * * * *